United States Patent
Bolen

(10) Patent No.: US 10,368,539 B2
(45) Date of Patent: Aug. 6, 2019

(54) SPECIES SPECIFIC EXTERMINATION DEVICE

(71) Applicant: Aviantronics, LLC, Gun Barrel City, TX (US)

(72) Inventor: Pat M. Bolen, Gun Barrel City, TX (US)

(73) Assignee: Aviantronics, LLC, Gun Barrel City, TX (US)

( * ) Notice: Subject to any disclaimer, the term of this patent is extended or adjusted under 35 U.S.C. 154(b) by 460 days.

(21) Appl. No.: 14/889,368

(22) PCT Filed: May 9, 2014

(86) PCT No.: PCT/US2014/037466
§ 371 (c)(1),
(2) Date: Nov. 5, 2015

(87) PCT Pub. No.: WO2014/183014
PCT Pub. Date: Nov. 13, 2014

(65) Prior Publication Data
US 2016/0157475 A1 Jun. 9, 2016

Related U.S. Application Data

(60) Provisional application No. 61/821,517, filed on May 9, 2013.

(51) Int. Cl.
*A01M 23/38* (2006.01)
*A01M 19/00* (2006.01)
(Continued)

(52) U.S. Cl.
CPC ............ *A01M 19/00* (2013.01); *A01M 23/38* (2013.01); *A01M 29/26* (2013.01); *A01M 99/00* (2013.01);
(Continued)

(58) Field of Classification Search
CPC ...... A01M 23/38; A01M 23/00; A01M 27/00; A01M 29/24; A01M 29/26; A01M 19/00
(Continued)

(56) References Cited

U.S. PATENT DOCUMENTS

| 968,523 | A | * | 8/1910 | Barney | ................. | A01M 23/36 |
| | | | | | | 43/79 |
| 1,001,400 | A | * | 8/1911 | Hertzberg | ............. | A01M 23/38 |
| | | | | | | 43/99 |

(Continued)

FOREIGN PATENT DOCUMENTS

| DE | 19954142 A1 * | 5/2001 | ............ A01M 23/20 |
| DE | 10130589 A1 * | 1/2003 | ............ A01M 1/026 |

(Continued)

OTHER PUBLICATIONS

International Search Report and Written Opinion for PCT/US2014/037466 from KIPO dated Mar. 27, 2015, 20 pages.

*Primary Examiner* — Darren W Ark
(74) *Attorney, Agent, or Firm* — Daniel J. Chalker; Chalker Flores, LLP

(57) ABSTRACT

The present invention includes an automated animal euthanization device for the destruction of an animal comprising: a housing having an housing opening to allow access to an interior cavity; a perch having a first perch end that extends into the interior cavity and a second perch end that extends through the housing opening and configured to accommodate the animal; a feed container position about the first perch end to provide food for the animal; an electrode set extending into the housing opening to contact the bird as it is positioned to eat the food; a camera position in the interior cavity to take a target image of the animal; a control unit connected to the camera to receive the target image and compare the target image to a set of reference images; a power supply connected to the control unit, the electrode set, (Continued)

and the camera to provide power for the operation thereof; and a container positioned below the perch to collect the animal falling from the perch.

9 Claims, 4 Drawing Sheets

(51) Int. Cl.
| | |
|---|---|
| *A01M 29/26* | (2011.01) |
| *A01M 99/00* | (2006.01) |
| *H04N 5/225* | (2006.01) |
| *H04N 5/232* | (2006.01) |
| *G06T 7/00* | (2017.01) |

(52) U.S. Cl.
CPC ............ *G06T 7/97* (2017.01); *H04N 5/2257* (2013.01); *H04N 5/23241* (2013.01)

(58) Field of Classification Search
USPC .............................. 43/98, 99, 112, 58, 77–79
See application file for complete search history.

(56) References Cited

U.S. PATENT DOCUMENTS

| | | | | | |
|---|---|---|---|---|---|
| 1,555,966 | A | * | 10/1925 | Hall | A01M 23/00 43/65 |
| 1,660,013 | A | * | 2/1928 | Morawiecki | A01M 23/38 235/98 R |
| 1,845,212 | A | * | 2/1932 | Allen | A01M 27/00 43/79 |
| 2,093,719 | A | * | 9/1937 | Sadakichi | A01M 23/24 43/58 |
| 2,537,209 | A | * | 1/1951 | Conley | A01M 23/38 43/64 |
| 2,763,092 | A | * | 9/1956 | Sheridan | A01M 23/18 43/70 |
| 3,007,277 | A | * | 11/1961 | Anderson | A01M 23/38 43/99 |
| 3,103,081 | A | * | 9/1963 | Zuliani | A01M 27/00 43/79 |
| 3,124,103 | A | * | 3/1964 | Stainbrook | A01K 39/0113 119/52.3 |
| 3,366,854 | A | * | 1/1968 | Robinson | A01M 29/26 174/113 AS |
| 3,638,348 | A | * | 2/1972 | Lusk | A01M 23/38 43/75 |
| 3,656,141 | A | * | 4/1972 | Hill | G08B 3/10 116/22 A |
| 4,015,176 | A | * | 3/1977 | Shanahan | A01M 23/38 361/232 |
| 4,038,639 | A | * | 7/1977 | Kuebler | A01M 29/06 116/22 A |
| 4,185,581 | A | * | 1/1980 | Tilton | A01M 29/00 116/22 A |
| 4,205,480 | A | * | 6/1980 | Gartner | A01M 23/38 43/98 |
| 4,299,048 | A | * | 11/1981 | Bayes | A01M 29/26 361/232 |
| 4,483,094 | A | * | 11/1984 | McKee | A01M 23/30 43/75 |
| 4,497,130 | A | * | 2/1985 | Fitzgerald | A01M 23/38 43/98 |
| 4,669,216 | A | * | 6/1987 | Moss | A01M 27/00 43/144 |
| 4,780,985 | A | * | 11/1988 | Coots | A01M 23/38 43/98 |
| 4,811,694 | A | * | 3/1989 | Holmquist | A01K 29/00 116/1 |
| 4,862,637 | A | * | 9/1989 | Dressel | A01M 29/26 256/10 |
| 5,095,646 | A | * | 3/1992 | Bunkers | A01M 29/26 361/232 |
| 5,406,742 | A | * | 4/1995 | Allen | A01M 23/38 43/98 |
| 6,088,948 | A | * | 7/2000 | Rønnau | A01M 23/02 43/64 |
| 6,396,402 | B1 | * | 5/2002 | Berger | A01M 31/002 119/713 |
| 6,609,330 | B1 | * | 8/2003 | Heitman | A01M 1/023 43/112 |
| 6,739,086 | B1 | * | 5/2004 | Lamb | A01M 23/02 43/98 |
| 6,807,767 | B1 | * | 10/2004 | Schade | A01M 31/002 43/77 |
| 7,020,996 | B2 | * | 4/2006 | Beroza | A01M 1/026 43/124 |
| 7,044,085 | B2 | * | 5/2006 | Arnold | A01K 3/005 119/712 |
| 7,317,399 | B2 | * | 1/2008 | Chyun | A01M 1/026 340/286.01 |
| 7,496,228 | B2 | * | 2/2009 | Landwehr | A01M 1/026 382/165 |
| 7,530,195 | B2 | * | 5/2009 | Muller | A01M 23/12 43/58 |
| 7,656,300 | B2 | * | 2/2010 | Ronnau | A01M 1/026 340/506 |
| 7,777,747 | B1 | * | 8/2010 | Krenz | A01K 29/00 345/501 |
| 7,841,297 | B2 | * | 11/2010 | Zigan | A01M 29/24 119/52.3 |
| 7,854,089 | B2 | * | 12/2010 | Deibert | A01M 19/00 43/71 |
| 7,916,951 | B2 | * | 3/2011 | Landwehr | A01M 1/026 382/162 |
| 8,112,934 | B2 | * | 2/2012 | Alter | A01M 31/002 43/58 |
| 8,139,858 | B1 | * | 3/2012 | Landwehr | A01M 1/026 382/165 |
| 8,391,550 | B2 | * | 3/2013 | Pachys | G01N 23/046 382/103 |
| 8,418,396 | B2 | * | 4/2013 | Moustirats | A01M 31/002 43/58 |
| 8,430,063 | B1 | * | 4/2013 | Riddell | A01M 29/26 119/712 |
| 8,598,998 | B2 | * | 12/2013 | Vassilev | A01M 29/16 340/384.2 |
| 8,733,291 | B2 | * | 5/2014 | Dunigan | A01K 31/00 119/463 |
| 8,755,571 | B2 | * | 6/2014 | Tsai | G06K 9/00 382/110 |
| 8,855,374 | B2 | * | 10/2014 | Fryshman | G06T 7/0004 348/135 |
| 8,896,452 | B2 | * | 11/2014 | Oppenheimer | H04Q 9/00 340/540 |
| 8,919,034 | B2 | * | 12/2014 | Alhuwaishel | A01K 69/06 43/100 |
| 8,988,230 | B2 | * | 3/2015 | Nohara | A01M 29/06 119/713 |
| 9,053,528 | B2 | * | 6/2015 | Fryshman | G06K 9/00 |
| 9,237,743 | B2 | * | 1/2016 | Gaskamp | A01M 23/22 |
| 9,381,646 | B1 | * | 7/2016 | Fryshman | B25J 9/1697 |
| 9,585,376 | B2 | * | 3/2017 | Park | A01M 1/026 |
| 9,615,566 | B2 | * | 4/2017 | Bond | A01M 27/00 |
| 9,664,813 | B2 | * | 5/2017 | Janet | G01V 8/12 |
| 9,807,346 | B2 | * | 10/2017 | Afanasyev | H04N 7/18 |
| 9,814,228 | B2 | * | 11/2017 | Pinkston | A01M 31/002 |
| 2003/0026484 | A1 | * | 2/2003 | O'Neill | G06K 9/6204 382/224 |
| 2005/0097808 | A1 | * | 5/2005 | Vorhies | A01M 23/18 43/61 |
| 2006/0032111 | A1 | * | 2/2006 | Willard | A01M 29/26 43/98 |
| 2006/0123693 | A1 | | 6/2006 | Muller et al. | |
| 2007/0245617 | A1 | * | 10/2007 | Deibert | A01M 23/10 43/72 |
| 2008/0120895 | A1 | * | 5/2008 | Schwartz | A01M 23/12 43/61 |
| 2009/0153659 | A1 | | 6/2009 | Landwehr et al. | |

(56) References Cited

U.S. PATENT DOCUMENTS

| | | | | |
|---|---|---|---|---|
| 2009/0199457 A1* | 8/2009 | Grigorov | .............. | A01M 1/026 43/99 |
| 2010/0306861 A1* | 12/2010 | Levin | ................ | G01N 33/5088 800/3 |
| 2011/0167709 A1* | 7/2011 | Pinkston | ............... | A01M 23/20 43/61 |
| 2014/0345188 A1* | 11/2014 | Connolly | .............. | A01M 23/02 43/58 |
| 2016/0227736 A1* | 8/2016 | Monk | ...................... | A01K 5/02 |
| 2017/0273277 A1* | 9/2017 | Monk | .................... | A01K 5/025 |
| 2017/0273290 A1* | 9/2017 | Jay | ........................ | A01M 1/026 |

FOREIGN PATENT DOCUMENTS

| | | | | | |
|---|---|---|---|---|---|
| DE | 102010054395 | B4 | * | 2/2014 | ............ A01M 1/026 |
| EP | 0990389 | A1 | * | 4/2000 | ............ A01M 23/38 |
| FR | 2619674 | A1 | * | 3/1989 | ............ A01M 27/00 |
| GB | 182371 | A | * | 7/1922 | ............ A01M 27/00 |
| GB | 1512607 | A | * | 6/1978 | ............ A01M 23/38 |
| GB | 2469096 | A | * | 10/2010 | ............ A01M 23/32 |
| JP | 08089152 | A | * | 4/1996 | |
| JP | 2004097019 | A | * | 4/2004 | |
| JP | 2005278486 | A2 | | 10/2005 | |
| JP | 2009050166 | A | * | 3/2009 | |
| JP | 2012055232 | A | * | 3/2012 | |
| JP | 2017085915 | A | * | 5/2017 | |
| JP | 6171144 | B2 | * | 8/2017 | |
| KR | 20100084787 | A | * | 7/2010 | |
| WO | WO-9848620 | A1 | * | 11/1998 | ............ A01M 23/02 |
| WO | WO-9918780 | A1 | * | 4/1999 | ............ A01M 1/026 |
| WO | 2014183014 | A3 | | 11/2014 | |
| WO | WO-2017120189 | A1 | * | 7/2017 | ............ A01M 31/00 |

* cited by examiner

SPECIES SPECIFIC EXTERMINATION DEVICE

TECHNICAL FIELD OF THE INVENTION

The present invention relates generally to methods and devices used in deterring and/or destroying animals and more specifically to deterring and selectively destroying selectively specific species of birds which are brood parasites.

BACKGROUND ART

Without limiting the scope of the invention, its background is described in connection with a device to selectively destroy birds of a specific species in specific locations. While some birds may be attractive and of a positive benefit, there are other birds that are destructive or at least undesirable. For example, some birds can associate in and around buildings used in grain storage and cause bird droppings that damage considerable amounts of grain. In buildings for the storage of machinery such as farm machinery or small aircraft, the droppings while not totally destructive are certainly undesirable. In addition, some species of bird are considered brood parasites, which mean the female lays her eggs in the nests of other birds, abandoning them to the care of foster parents. The foster birds raise the Cowbird chick to the detriment of their own young. As a result, many devices such as whistles, fake animals, scarecrows and the like have commonly been used in an attempt to frighten birds from an area. In addition, some programs have been implemented to euthanize these invasive species.

For example, U.S. Pat. No. 8,430,063, entitled, "Animal Deterrent Device with Insulated Fasteners," discloses an animal deterrent device and methods for installing and producing an animal deterrent device for delivering an electric shock to an animal, pest, or bird to be deterred, having the typical components of a non-conductive base to which the electrically conductive elements are attached. The bottom layer unfolds outward to allow sewing of the conductive elements to the top layer of the elongated base, while preventing the stitching from penetrating the bottom layer of the elongated base. The bottom layer is then folded back into place after sewing is completed, thereby insulating any hole, fastener, or conductive element that pushed through the top layer of the elongated base from water or other material that may congregate at the bottom exterior, preventing unwanted arcing to the exterior surface below.

U.S. Pat. No. 7,044,085, entitled, "Nuisance Animal Controller," discloses a device that utilizes a specialized shocking mechanism to deter nuisance animals. Through cognitive learning, the device teaches animals to keep away from areas where they have established themselves as a problem.

U.S. Pat. No. 4,299,048, entitled, "Pest Bird Control," discloses a device for mass exterminating of objectable pest birds, such as starlings or the like; the device including an overhead cable supported between posts, the cable carrying a plurality of spaced-apart copper electrodes along its outer side, so that, when a horde of pest birds try to land upon the wire by their toes straddling it, they close an electric circuit between the electrodes, which are connected to a power source, so that the birds are thus electrocuted.

DESCRIPTION OF THE INVENTION

The present invention provides an automated bird euthanization device for the destruction of a bird including a housing comprising an exterior shell having an housing opening to allow access to a housing interior; a cavity positioned between the exterior shell and the housing interior; a feed storage container positioned in the cavity; a feed delivery slot in the housing interior and connected to the feed storage container to provide food; a perch having a first perch end that extends into the interior cavity and a second perch end that extends through the housing opening and configured to accommodate the bird; a feed container connected to the first perch end and positioned about the feed delivery slot to hold food for the bird; an electrode set extending into the housing opening to contact the bird as it is positioned to eat the food; a camera position in the interior cavity to take a target image of the bird; a data storage device connected to the camera and the control unit to store the target image, a set of reference images, and associated data; a control unit connected to the camera to receive the target image and compare the target image to the set of reference images; a power supply connected to the control unit, the electrode set, and the camera to provide power for the operation thereof; one or more batteries connected to the power supply; one or more solar panels connected to the one or more batteries; wherein the control unit applies a current/voltage to the electrode set under certain conditions and the control unit controls the parameters associated with the current/voltage applied to the electrode set; a timer connected to the power supply, the control unit and to the electrode set to control the duration of the current/voltage applied to the electrode set; a container positioned below the perch to collect the bird falling from the perch; and an automated lid positioned on the container and connected to the control unit to open and close.

The present invention provides an automated animal euthanization device for the destruction of an animal comprising: a housing comprising an exterior shell having an housing opening to allow access to an interior cavity; a perch having a first perch end that extends into the interior cavity and a second perch end that extends through the housing opening and configured to accommodate the animal; a feed container position about the first perch end to provide food for the animal; an electrode set extending into the housing opening to contact the bird as it is positioned to eat the food; a camera position in the interior cavity to take a target image of the animal; a control unit connected to the camera to receive the target image and compare the target image to a set of reference images; a power supply connected to the control unit, the electrode set, and the camera to provide power for the operation thereof; and a container positioned below the perch to collect the animal falling from the perch.

The present invention provides a method of euthanization a bird by providing an automated animal euthanization device for the destruction of an animal comprising: a housing comprising an exterior shell having an housing opening to allow access to an interior cavity; a perch having a first perch end that extends into the interior cavity and a second perch end that extends through the housing opening and configured to accommodate the animal; a feed container position about the first perch end to provide food for the animal; an electrode set extending into the housing opening to contact the bird as it is positioned to eat the food; a camera position in the interior cavity to take a target image of the bird; a control unit connected to the camera to receive the target image and compare the target image to a set of reference images; a power supply connected to the control unit, the electrode set, and the camera to provide power for the operation thereof; and a container having a lid positioned below the perch to collect the animal falling from the perch;

providing a food in the feed container; detecting a bird at the feed container; taking an image of the bird; comparing the target image to the set of reference images; determining if the bird is in the set of reference images; energizing the electrode set for a time sufficient to destroy the bird; open the lid of the container to allow the bird to enter the container; and closing the lid of the container.

DESCRIPTION OF THE DRAWINGS

For a more complete understanding of the features and advantages of the present invention, reference is now made to the detailed description of the invention along with the accompanying figures and in which.

DESCRIPTION OF EMBODIMENTS

Figure 1:
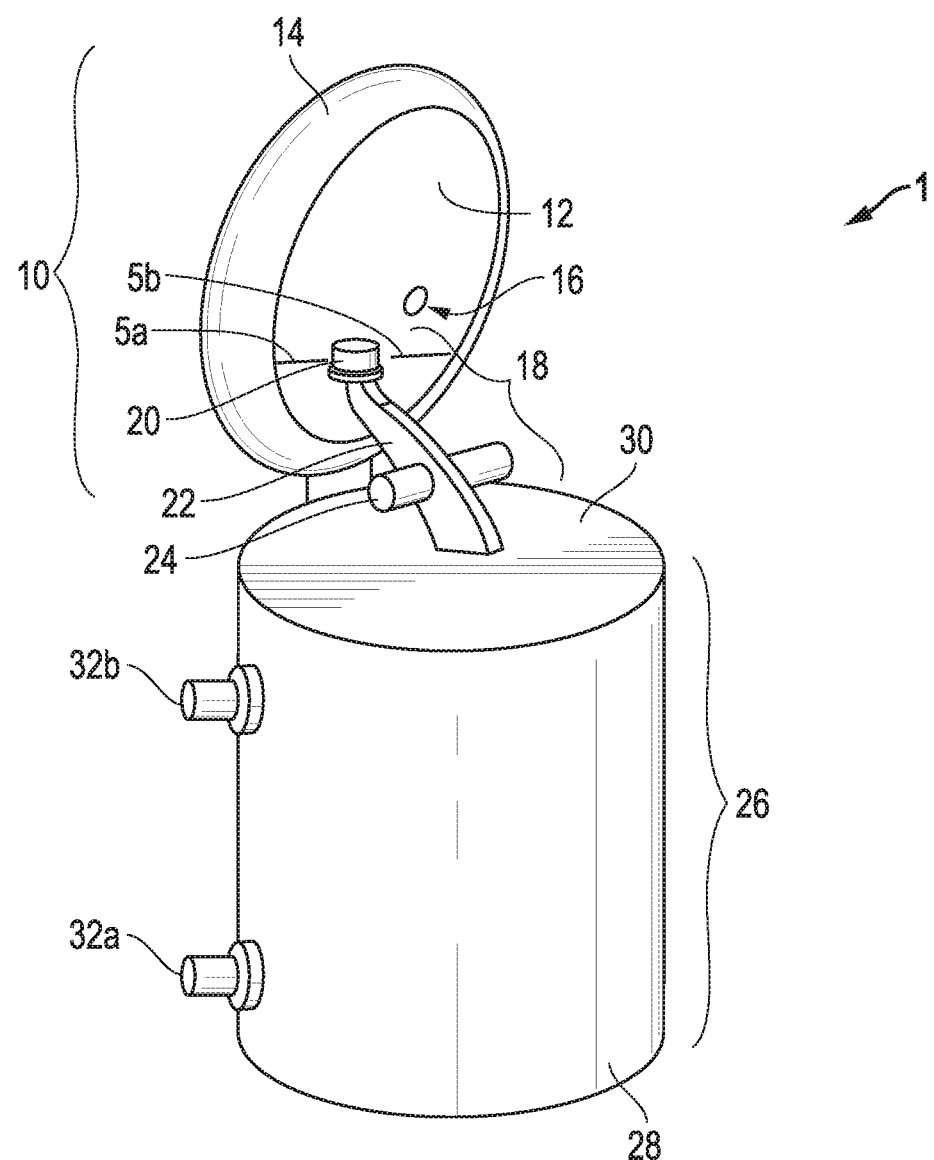
FIG. 1 is a perspective view of one embodiment of the automated euthanization device of the instant invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

One major contributing factor to the declining song bird numbers in North America is the spread of the Cowbirds resulting from changes in the landscape throughout North America. Cowbirds once occurred only in short-grass prairies, where they followed buffalo herds, feeding on insects stirred up by the grazing animals. Environmental changes (e.g., the introductions of domesticated grazing animals, and cultivated fields, and lawns) have greatly benefited the Cowbird, helping it to spread to new territories and prey on more songbird species. The most common to be parasitized are the warblers, vireos, flycatchers, and finches. This is a problem because of the reproductive strategies which the species employs. The Cowbird is what is referred to as a brood parasite. This means the female lays her eggs in the nests of other birds, abandoning them to the care of foster parents. The foster birds raise the Cowbird chick to the detriment of their own young. Because the female Cowbird can lay as many as 70 eggs per season. For example, the Cowbird parasitizes more than 225 species of North American birds and poses a particular danger to already-threatened species like the Black-capped Vireo and the Golden-cheeked Warbler. Some species of birds are able to resist parasitism by Cowbirds, but many are not. These birds employ a number of strategies for dealing with Cowbird parasitism. Some aggressive species, such as the Mockingbird, actively chase Cowbirds away from their nests. Others species will push the Cowbird egg out of the nest, or build over the egg and re-nest. Still other species will simply abandon the nest. Studies have shown that the removal of one female Cowbird enhances the survival of 35 Songbirds per year.

Cowbirds routinely travel large distances between roosting areas, and feeding areas. It is not feasible to eliminate grain fields and suburban yards, or remove all grazing animals from the landscape to control parasitism by Cowbirds. Therefore, trapping of Cowbirds to reduce their numbers becomes an important option to consider if we are to prevent declines in Songbird populations. Rather than removing cattle in order to reduce parasitism, the members of the Central Texas Cattlemen's Association and Texas Parks and Wildlife Department have found that parasitism rates can be reduced in Black-capped vireos by using the cattle to attract Cowbirds into traps located near the cattle. This way the traps are away from the vireo's preferred brushy habitat, and do not interfere with nesting. Locating the traps to an area where there is a concentration of cattle grazing dramatically increases the number of Cowbirds caught in the traps. The traps are checked daily to make sure any non-target species of bird (any bird that is not a Cowbird) can be quickly released. Female Cowbirds are removed and humanely killed by cervical dislocation. Some of the males are banded and released to help learn more about Cowbird movements.

Many other landowners are now actively trapping Cowbirds to help reduce Songbird parasitism rates. Because Cowbirds are a native species in North America, they are protected under the Migratory Bird Treaty Act. However, there are exceptions to this law for acts of depredation by a few select species. Under the Texas Parks and Wildlife Code, Section 64.002(c) Brown-headed Cowbirds are included among this small group of eight non-protected bird species that may be killed when "found committing or about to commit depredations on ornamental or shade trees, agricultural crops, livestock, or wildlife, or when concentrated in numbers and in a manner that constitutes a health hazard or other nuisance" and may be killed at any time, and their nests or eggs may be destroyed." This is the real job of protecting songbirds from nest parasitism. Whichever method is used to kill Cowbirds, it must be humane, fast, and certain. The recommended method is cervical dislocation, or separating the vertebra. For example, cervical dislocation: Hold top of neck between thumb and forefinger, grab head with other hand, turn and lift until you feel the cervical vertebrae detach from the head. Alternative dispatch methods include using carbon dioxide gas (dry ice) in a 5-gallon bucket may be used to euthanize brown-headed Cowbirds. Birds should be dead within 20 seconds. However these methods require a person to euthanize each of the birds manually.

The present invention provides a device that allows the automated real-time evaluation of the bird bread and the real-time destruction of the bird if certain criteria are met. Generally the instant device includes an enclosure that provides a source of food for a bird with a camera position to take an image of the bird as it eats the food. This image is then stored and compared with a database of images of various species of bird to determine if the bird is within the species of birds determined to be euthanized. If the criteria are met, and the bird is to be euthanized, then an electrical charge is to be applied to the electrodes to euthanize the bird. Alternatively, if the criteria are not met the instant device may allow the bird to feed or apply a lesser charge to deter the bird from feeding in that location or stun the bird for capture. Although the device is described in conjunction with birds it is conceived of that the device may be used on any other animals, including rats, mice, cats, dogs, bugs, coyotes, wolves, pigs, fish, and aquatic animals, etc. The modifications would be to the size of the enclosure, the food, and the current and voltage used to euthanize the animal.

FIG. 1 is a perspective view of one embodiment of the automated euthanization device of the instant invention. The automated euthanization device 1 includes a housing enclosure 10 which consists of a housing interior 12 that is protected from the elements of a suitable size to allow egress of the animal. The housing interior 12 is enclosed by a housing exterior 14 that protects the housing interior 12 and provides an area for the storage of electrical components used in the automated euthanization device 1. The housing interior 12 includes a camera 16 positioned to image the animal as it is in the housing interior 12. A perch 18 is positioned partially within the housing interior 12 to position the animal such that the camera can take an image of the animal. A set of electrodes (5a and 5b) is positioned partially within the housing interior 12 as to not obstruct the animal from access to the housing interior 12 but to contact the animal such that when a current/voltage is applied to the electrodes the animal will be euthanized. The perch 18 includes a food container 20 on one end of a perch shaft 22 and also includes a rest 24 at the other end of the perch shaft 22. The automated euthanization device 1 includes a storage container 26 connected to and positioned under the housing enclosure 10 such that a euthanized animal will fall into the storage container 26. The storage container 26 includes a container 28 that may be of any size that is convenient and include a container lid 30 which can be automated to open for depositing the euthanized animal and closed to store the contents of the contents container 28. In addition, the storage container 26 may include mounting connections (32a and 32b) to allow the storage container 26 to be affixed to a structure (e.g., pole, building enclosure, structure, tower, etc). The other end of the perch shaft 22 is attached to the top of the lid 30, but in other embodiments the perch shaft 22 could be attached to the housing interior 12 or housing exterior 14.

Figure 2:
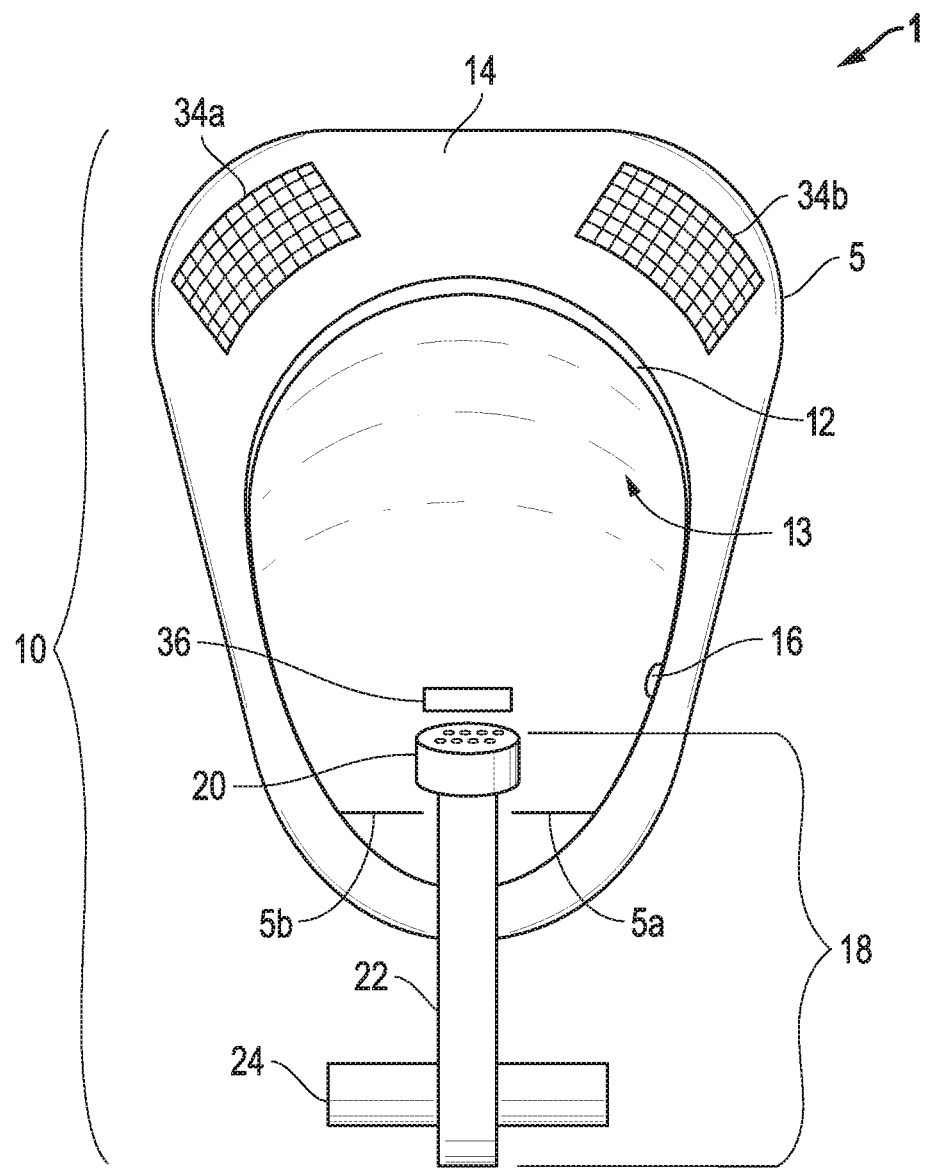
FIG. 2 is a front view of one embodiment of the automated euthanization device of the instant invention.

FIG. 2 is a front view of one embodiment of the automated euthanization device of the instant invention. The automated euthanization device 1 includes a housing enclosure 10 which consists of a housing interior 12 that is protected from the elements, and is of a suitable size to allow egress of the animal via housing opening 13. The housing interior 12 is enclosed by a housing exterior 14 that protects the housing interior 12 and provides an area for the storage of electrical components if used in the automated euthanization device 1. The housing exterior 14 includes one or more solar cells 34a and 34b that are exposed to the sun to allow charging of a battery (not shown) that is used to operate the electrical components in the automated euthanization device 1. The housing interior 12 includes a camera 16 positioned to image the animal as it is seen in the housing interior 12. A perch 18 is positioned partially within the housing interior 12 to position the animal such that the camera can take an image of the animal. A set of electrodes (5a and 5b) is positioned partially within the housing interior 12 as to not obstruct the animal from access to the housing interior 12 but to make contact with the animal, such that, the when a current/voltage is applied to the electrodes the animal will be euthanized. The perch 18 includes a food container 20 on one end of a perch shaft 22 and also includes a rest 24 at the other end of the perch shaft 22. The food container 20 is in communication with a feed storage container (not shown) that includes a feed delivery slot 36 positioned to supply feed to the food container 20. The automated euthanization device includes a storage container (not shown) connected to and positioned under the housing enclosure 10 such that a euthanized animal will fall into the storage container (not shown).

Figure 3:
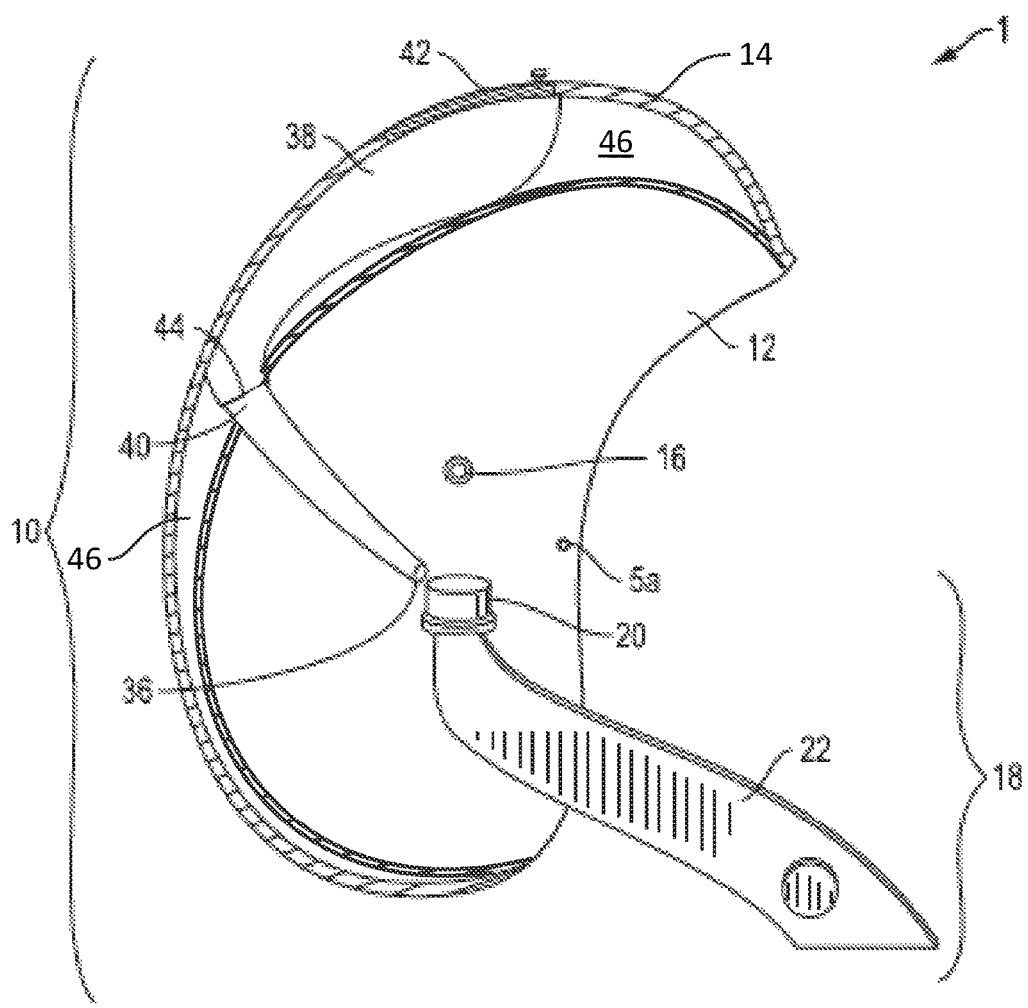
FIG. 3 is a cut away view of one embodiment of the automated euthanization device of the instant invention.

FIG. 3 is a cutaway view of one embodiment of the automated euthanization device of the instant invention. The automated euthanization device 1 includes a housing enclosure 10 which consists of a housing interior 12 that is protected from the elements of a suitable size to allow egress of the animal. The housing interior 12 is enclosed by a housing exterior 14 that protects the housing interior 12 and provides an area or interior cavity 46 for the storage of electrical components used in the automated euthanization device 1. The housing interior 12 includes a camera 16 positioned to image the animal as it is seen in the housing interior 12. A perch 18 is positioned partially within the housing interior 12 to position the animal such that the camera 16 can take an image of the animal. A set of electrodes (5a) is positioned partially within the housing interior 12 as to not obstruct the animal from access to the housing interior 12 but to make contact with the animal, such that, the when a current/voltage is applied to the electrodes (5a) the animal will be euthanized. The food container 20 is in communication with a feed storage container 38 that includes a feed delivery slot 36 positioned to supply feed to the food container 20 through a delivery tube 40. The feed storage container 38 can be refilled through door 42. In operation, the feed storage container 38 is filled through the door 42 which allows the food to be kept dry and inaccessible by animals. The food container 20 and the delivery tube 40 may be separated by a supply door 44 that may be connected to an activator to allow the supply door 44 to open and close to allow the food to travel down the delivery tube 40 from the feed storage container 38 and out the feed delivery slot 36 to allow deposition in the food container 20.

The set of electrodes may include numerous electrodes (1, 2, 3, 4, 5, 6, 7, 8, 9 10 12, 14, 16, 18, 20, 25, or more electrodes) on each side of the opening to ensure contact with the bird or animal. In addition, the sets of electrodes may include electrodes of differing length to ensure contact with the bird or animal. The positions of the electrodes may also include the perch to ensure the euthanization of the bird or animal.

Figure 4:
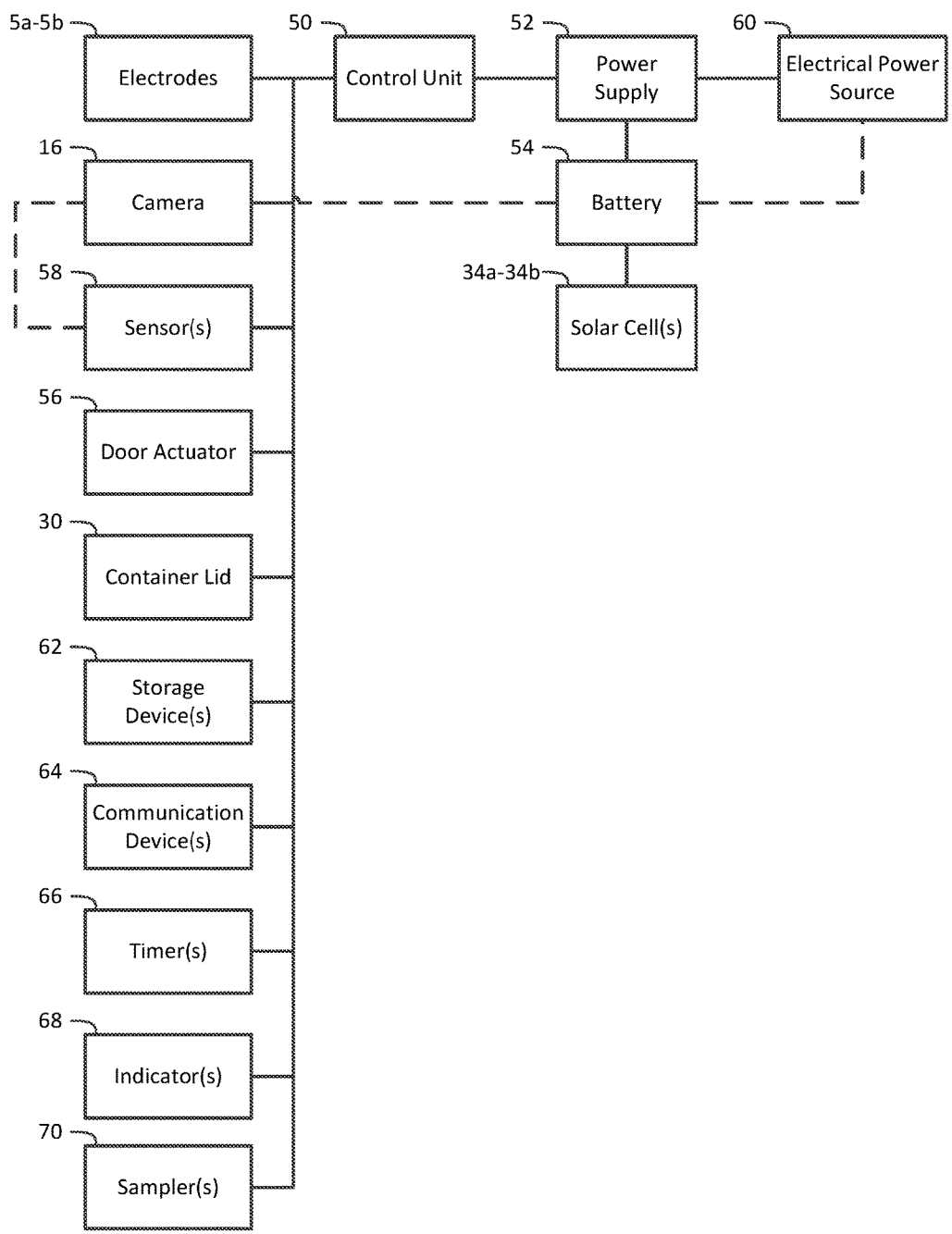
FIG. 4 is a block diagram of various components used to operate one embodiment of the automated euthanization device of the instant invention.

Now also referring to FIGS. 3 and 4, one embodiment of the automated euthanization device 1 of the instant invention provides a housing enclosure 10 which consists of a housing having a housing interior 12 that is protected from the environment and can be of a suitable size to allow egress of the desired animal. The housing interior 12 is enclosed by a housing exterior 14 that encloses and protects the housing interior 12. The cavity 46 between the housing interior 12 and the housing exterior 14 can be used to house the components used to operate the automated euthanization device 1. For example, within the cavity 46 between the housing interior 12 and the housing exterior 14 may house a control unit 50 connected to a power supply 52, one or more solar cells 34a, 34b, one or more batteries 54, or a combination thereof. The control unit 50 may also be connected to the camera 16 that is at least partially stored in the cavity 46 and the one or more electrodes 5a, 5b that pass through the housing interior 12. The control unit 50 may be connected to the door actuator 56 or activation mechanism for the supply door 44 and the container lid 30. In addition the control unit 50 may be connected to one or more sensors 58 that are at least partially within the cavity 46.

The automated euthanization device 1 may be powered by different sources depending on the specific application. The housing exterior 14 may include one or more solar cells 34a, 34b that are exposed to the sun and are connected to a battery 54. The battery 54 can then be used to operate the electrical components in the automated euthanization device 1. As an alternative, the automated euthanization device 1 can be connected directly to an AC or DC current supply 60 that is used to power the automated euthanization device 1 directly or can be used to charge a battery 54 that is used to power the automated euthanization device 1. Another embodiment may include the use of both a battery 1 and a constant power supply source 60 to operate the device.

The housing interior 12 may include various sensors 58 in addition to the camera 16. The camera 16 is positioned to image the animal in the housing interior 12. A sensor 58 may be connected to the control unit 50 and the camera 16 to turn the automated euthanization device 1 on and off upon the detection of an animal, such sensor types are common in the art and well within the ability of the skilled artisan to implement.

The camera 16 is at least partially stored in the cavity 46 and positioned to image the animal. The camera 16 can be any camera that is currently used in the art or known to the skilled artisan and provides the desired resolution. The camera 16 may be connected to the battery 54 and to a 50 control unit.

The control unit 50 is used to control the operation of the components of the automated euthanization device. The control unit 50 is connected to the camera 16, the power supply 52, the electrodes 5a, 5b, the sensors 58, the activators and/or actuators 30, 56 and other components including processors, storage devices 62, communication devices 64, timers 66 and the like.

A perch 18 is positioned partially within the housing interior 12 to position the bird such that the camera 16 can take an image of the bird and the electrodes 5a, 5b can contact the bird. The perch 18 includes a food container 20 on one end of a perch shaft 22 that includes a rest 24. The food container 20 is in communication with a feed storage container 38 that includes a feed delivery slot 36 positioned to supply feed to the food container 20. The control unit 50 is in communication with the supply door 44 to allow the food to pass to the food container 20. The control unit 50 is also in control of opening and closing the container lid 30 when necessary.

The camera 16 is connected to the control unit 50 to take a target image that is then stored on a storage device 62 and optionally data is stored that relates to the picture, e.g., time, date, GPS location, etc. The target image can then be compared with reference images stored on the storage device 62 to determine the species of bird and evaluate if the bird is within the birds determined to be euthanized or released. If the target and reference images match, the control unit 50 energizes the electrodes 5a, 5b and a circuit is connected to euthanize the bird. If the target and reference images do not match the control unit 50 does not energize the electrodes 5a, 5b and the bird is not euthanized. Alternatively, the control unit 50 energizes the electrodes 5a, 5b to a level to stun the bird or to discourage the bird from eating. In addition, the control unit 50 may be connected to a timer unit 66 that controls the duration that the electrodes 5a, 5b are energizes. When the control unit 50 energizes the electrodes 5a, 5b and the bird is euthanize the carcass will fall into the storage container 26 connected to and positioned under the housing enclosure 14. The storage container 26 includes a container 28 having a lid 30 which can be automated through the control unit 50 to open for depositing the euthanized animal and closed to contain the contents for storage.

In addition, the automated euthanization device 1 may include one or more sensors 58 for the detection of a bird. The sensor 58 may be any conventional sensor and may be connected to the control unit 50. The control unit 50 may include numerous parts that are interconnected or in communication with each other to operate the automated euthanization device 1. For example, the control unit 50 is connected to a power supply 52 which may be directly connected to a power source (i.e., grid) 60 or connected to a battery 54 that is charged by solar cells 34a, 34b or connection to an electrical power source 60. The control unit 50 is also connected to a camera 16 and one or more sensors 58 that indicate the presence of an animal, the lack of food or other input information. The control unit 50 includes a processor and data storage device 62 to store information and to record data related to the animal. The control unit 50 also includes output connections in the form of an electrode output that supplies and controls power to the electrode 5a, 5b for operation and a door control output that supplies and controls power to the container door 30 for operation. The door 30 can be provided with a limit switch, which can disable the power to the automated euthanization device 1 when the access door 30 is opened to allow for disposal of the carcasses. The storage container 26 may also include a level sensing means, including a level sensor 58 and low-level indicator 68. The trap apparatus may also include an indicator 68 to show when electrocution of vermin has occurred. Further, there also may be an indicator 68 to show if the storage container 26 is full. In addition, the control unit 50 may include a timer 66 and or one or more associated timers that can control the duration of the electrode current, food delivery, storage door operation, camera operation, data storage, data transmission and WI-FI or transmission access. Other components may include one or more DC to AC converters and one or more solenoids.

It is also contemplated the electrocution time and/or current characteristics, for example voltage, amperage and the like may be adjusted as needed to ensure efficient electrocution of different types of animals. In an embodiment, which is not meant to be limiting in any manner, the electrocution time can be held for about 1 second to about 60 seconds, about 1 second to about 30 seconds, about 2 seconds to about 30 seconds, or about 3 seconds to about 20 seconds, before being disposed of as described herein. In one preferred embodiment, the bird can be electrocuted for about 10 seconds.

Some of the birds include Screaming Cowbird, *Molothrus rufoaxillaris*, Giant Cowbird, *Molothrus oryzivorus*, Bronzed Cowbird, *Molothrus aeneus*, Shiny Cowbird, *Molothrus bonariensis*, Brown-headed Cowbird, *Molothrus ater*, Baywing *Agelaioides badius*, the Old World cuckoos in Eurasia and Australia, American Coots, Cowbirds and Black-headed Ducks in the Americas, and indigobirds, whydahs, and the honeyguides in Africa. Although any animal can be used provided an image and characteristic can be identified to allow the comparison of an image of the animal with a reference image.

The present invention also provides a device that allows the automated real-time evaluation of the bird bread and the real-time capturing of the bird if certain criteria are met. Generally the instant device includes an enclosure that provides a source of food for a bird with a camera position to take an image of the bird as it eats the food. This image is then stored and compared with a database of images of various species of bird to determine if the bird is within the birds determined to be captured. If the criteria are met and the bird is to be captured then an electrical charge is to be applied to the electrodes to stun the bird. Alternatively, if the criteria are not me the instant device may allow the bird to feed or apply a lesser charge to deter the bird from feeding in that location. Although the device is described in conjunction with birds it is conceived of that the device may be used with any other animals including rats, mice, cats, dogs, bugs, coyotes, wolves, pigs, fish and aquatic animals etc. The modifications would be to the size of the enclosure, the food, and the current and voltage used to stun the animal.

In one embodiment the automated euthanization device may be made from a fiberglass, a polymer, a plastic or a combination thereof. For example, the automated euthanization device may be blowmolded and have dimensions of 12 inches high and 8 inches wide and 7 inches deep with a container from 10-30 gallons. The walls may be any thickness ($1/8^{th}$ inch). Although the skilled artisan will recognize that the enclosure may be of any size necessary and of any shape desired dependent on the conditions, environmental conditions, animal of interest, available power sources, etc.

In addition, the instant invention may include one or more sensors 58, samplers 70 or a combination thereof connected to the control unit 50 or controlled independently of the control unit 50. The sensor 58 may be a thermal imaging sensor, a temperature sensor, a humidity sensor, a weather related sensor, a proximity sensor, a wind sensor, a water temperature sensor and/or a depth sensor for marine applications, and other sensor that is known to the skilled artisan to record any type of data.

The sampler 70 may be a tissue sampler that takes a tissue sample from the animal as it is eating the food, and may be used independently of the euthanization feature. For example, in the automated bird euthanization device, a tissue sampler 70 in the form of a biopsy needle is positioned to remove a sample from the bird as it stands to feed. The camera 16 records an image of the bird and the image is processed to determine if euthanization is necessary. A sample is then taken and the bird released or euthanized.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. An automated bird euthanization device for a destruction of a bird comprising:
   a housing comprising an exterior shell having a housing opening to allow access to a housing interior, and an internal cavity formed between the exterior shell and the housing interior;
   a feed storage container positioned in the internal cavity;
   a feed delivery slot in the housing interior and connected to the feed storage container to provide the food;
   a perch having a first perch end that extends into the housing interior and a second perch end that extends through the housing opening and configured to accommodate the bird;
   a feed container connected to the first perch end and positioned about the feed delivery slot to hold food for the bird;
   an electrode set extending into the housing opening to contact the bird as it is positioned to eat the food;
   a camera positioned in the interior cavity to take a target image of the bird;

a data storage device connected to the camera and a control unit to store the target image, a set of reference images, and associated data;

the control unit connected to the camera to receive the target image and compare the target image to the set of reference images;

a power supply connected to the control unit, the electrode set, and the camera to provide power for the operation thereof;

one or more batteries connected to the power supply;

one or more solar panels connected to the one or more batteries;

wherein the control unit applies a current/voltage to the electrode set under certain conditions and the control unit controls the parameters associated with the current/voltage applied to the electrode set;

a timer connected to the power supply, the control unit and to the electrode set to control a duration of the current/voltage applied to the electrode set;

a container positioned below the perch to collect the bird falling from the perch; and an automated lid positioned on the container and connected to the control unit to open and close the automated lid, and wherein the second perch end is connected to the automated lid.

2. The device of claim 1, wherein the bird is a cowbird.

3. The device of claim 1, wherein the timer closes an electrocution circuit for between 1-30 seconds.

4. The device of claim 1, wherein the associated data is gps data, images, times, locations, or a combination thereof.

5. A method of euthanization of an animal comprising the steps of:

providing the automated bird euthanization device for the destruction of a bird of claim 1;

providing the food in the feed container;

detecting a bird at the feed container with a sensor connected to the control unit;

taking the target image of the bird with the camera;

comparing the target image to the set of reference images via the control unit;

determining if the target image of the bird matches one of the reference images in the set of reference images via the control unit; and energizing the set of electrodes via the control unit for a time determined by the timer sufficient to destroy the bird.

6. The method of claim 5, further comprising:

opening the automated lid via the control unit to allow the animal to enter the container; and closing the automated lid of the container via the control unit.

7. The method of claim 5, further comprising closing an electrocution circuit for between 1-30 seconds using the timer.

8. The method of claim 5, further comprising:

storing the target image in the data storage connected to the control unit; and wherein the set of reference images and the associated data are stored in the data storage, and the associated data is gps data, images, times, locations, or a combination thereof.

9. The method of claim 5, wherein the target image contains data representing about 50% of the bird.

* * * * *